3,360,459
PROCESS FOR REMOVING WATER FROM SOLUTIONS, USING OSMOTIC MEMBRANES TREATED WITH STABILIZING AGENTS
William M. King, Walnut, and Charles R. Cannon, Baldwin Park, Calif., assignors to Aerojet-General Corporation, El Monte, Calif., a corporation of Ohio
Filed Dec. 8, 1965, Ser. No. 513,665
8 Claims. (Cl. 210—22)

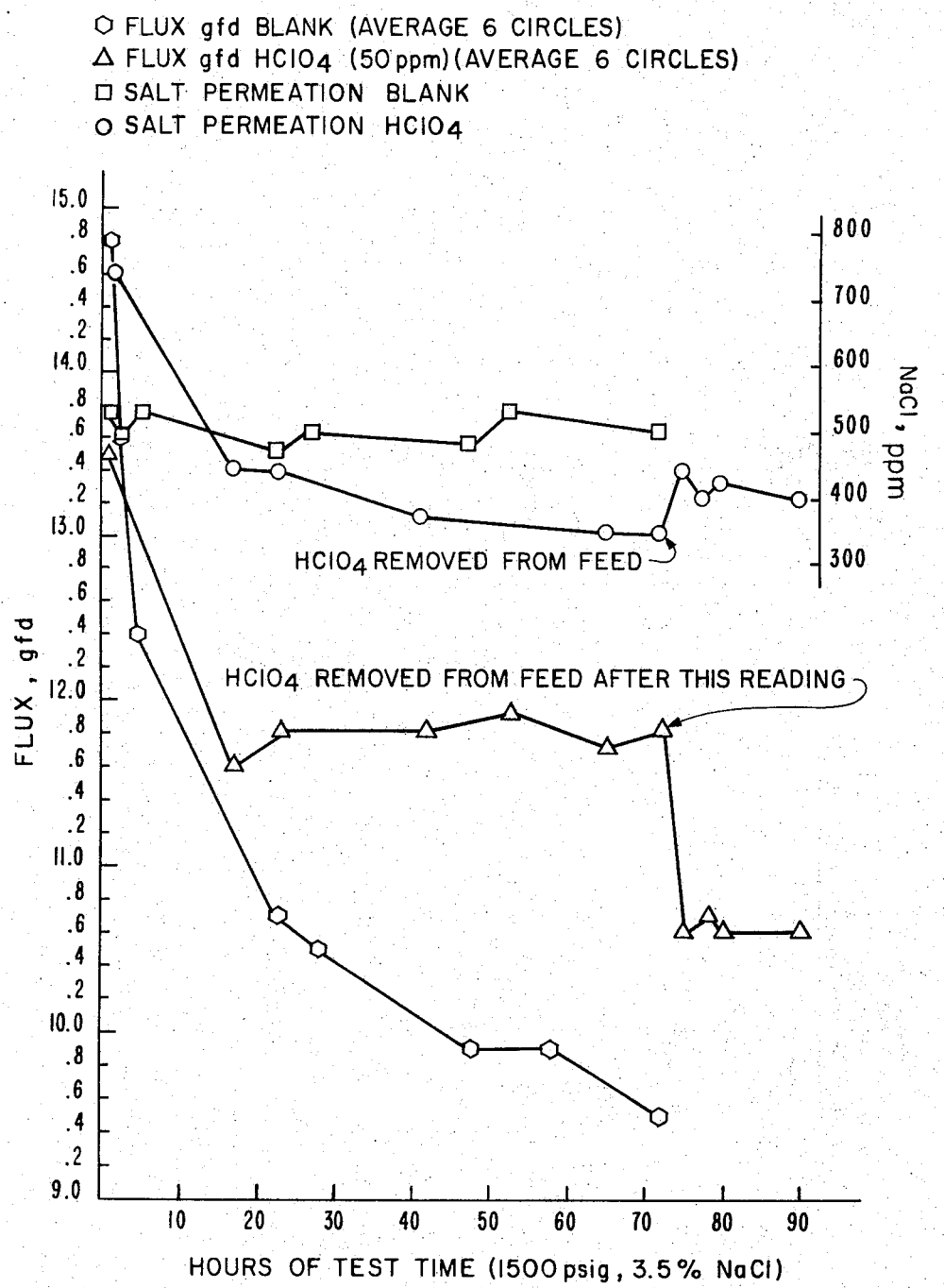

ABSTRACT OF THE DISCLOSURE

A process for slowing the flux decline of a reverse osmosis membrane comprising providing perchloric acid in the feed water in a concentration in the range of approximately five to five hundred parts of perchloric acid per million of the feed water.

---

This invention deals with the use of membranes for the concentration of solutions. More particularly, this invention deals with the demineralization of saline waters including sea water, and other waters containing various dissolved inorganic salt. This invention also finds application in the removal of materials from a solution, such as detergents, viruses, proteins, and other such material.

The removal of water from aqueous solutions and the concurrent concentration of the solute is a common practice. It is usually attained by distillation techniques. More recently a method has been developed for the concentration of solutions using a semi-permeable osmotic membrane. These membranes, however, particularly when used for the desalination of sea water have proven to be unsatisfactory in reducing the sodium chloride content of the sea water to an acceptable level at an acceptable flow rate of water through the membrane.

It has been found that the flux of an osmotic membrane normally declines quite rapidly during the first 3 to 4 days of operation. It then declines at a much slower rate until it becomes unserviceable and must eventually be replaced. We have discovered, however, that the use of certain additives in the feed water will enhance the performance of osmotic membranes and will result in an increase in the life expectancy. Specifically, we have found that stabilizing agents such as perchloric acid ($HClO_4$) stem the decline of the flux after only 15 to 20 hours of operation, thus reducing the total decay by 50% or more, while maintaining salt rejection characteristics at acceptable levels. The perchloric acid can be in a concentration between 5 and 500 parts per million of the saltwater solution, although the preferred range is between 25 and 150 parts per million. Optimum concentration has been determined to be 50 parts per million.

It is therefore, an object of this invention to provide a means whereby a semi-permeable osmotic membrane will concentrate solutions at a rate and with results superior to those which have heretofore been available.

It is a further object of this invention to provide means of improving purification of fluid, by means of a semipermeable osmotic membrane, which will reduce the decline of said membrane by 50% or more, and thereby extend the useful life thereof.

Further objects and additional advantages of the invention will become apparent from the following detailed description and appended drawing which graphically illustrates the effect of Perchloric Acid additive in the feed water on treatment of fluids.

The invention involves the treatment fluids with membranes such as those disclosed in U.S. Patent No. 3,133,132 as well as other membranes of a similar nature. These membranes are prepared by casting a solution of a film-forming cellulosic ester, water, a solvent for the cellulosic ester and a swelling agent for the cellulosic ester.

Any solvent for a cellulosic ester such as acetone, dioxane, methyl ethyl ketone, ethyl alcohol and/or methyl alcohol may be used as solvents. However, acetone is the preferred solvent. Generally, sufficient solvent is employed to reduce the viscosity of the casting solution to be easily handled. Preferably from about 200 to about 400 parts of solvent are employed per 100 parts of cellulosic ester. The cellulose acetate membranes can be prepared by casting a film of the above described solution on glass at a temperature below about 0° C.

Preferably the casting solution is maintained at about −12° C. to about 0° C. The film may be cast at a thickness of about 2.5 mils to about 20 mils. After the film is cast, it is preferably allowed to dry for a time sufficient to allow any streaks produced in the casting operation to smooth out. Generally, this time is from about three minutes to about eight minutes.

The film is allowed to congeal in cool water, preferably ice water, for a time sufficient to allow the membrane to soak loose from the glass plate. In general, this time ranges from about 10 to about 20 minutes.

The membrane is then heated at a temperature of about 77° to about 90° C., in order to fix the membrane and obtain desirable semi-permeability. The membrane is heated for a time ranging from about 5 minutes to about 1 hour or longer. The time for which the membrane is heated has little effect on the resulting flux and semipermeability of the membrane. The temperature at which the membrane is heated, however, has a significant effect on the semi-permeability and flux of the membrane. A higher temperature will cut down the flux, the amount of material passing through the membrane, but will increase the amount of waste material removed, that is, the purity of the water recovered.

The membrane is then mounted in a pressure cell, with the air-dried surface of the membrane in contact with the solution to be treated. The pressure under which the solution is placed in order to obtain separation of pure water is higher than the osmotic pressure of the solution. Generally, however, a higher pressure is desirable in order to obtain a better removal and higher flow of liquid through the membrane. Thus, the pressure applied for sea water is generally between 400 and 1500 p.s.i. and may be higher.

Other membranes which may be formed in a similar manner to that described above and which are effectively treated by the method of this invention, include membranes based upon cellulosic esters other than cellulose acetate as well as membranes based upon other than a cellulosic system.

The following example is given in illustration and is not intended to limit the scope of the above defined invention. In the example and throughout this specification, parts and percentages are by weight unless otherwise indicated.

A casting solution was prepared by mixing 100 g. of cellulose acetate (Eastman Chemical Products, Incorporated, No. E–398–3), 300 g. of acetone, 45 g. of water, and 4.5 g. each of magnesium perchlorate, magnesium bromide and zinc bromide. A film was cast ten mils thick on glass at −12° C., allowed to dry three minutes, then set in ice water. The membrane was allowed to soak loose from the glass plate, then heated to 89° C. for five minutes in water, cooled, and stored in deionized water.

The membrane was mounted in a pressure cell with the air-dried surface of the membrane in contact with a 3.5% saltwater solution to which was added 50 parts per million perchloric acid ($HClO_4$). This solution was circulated over the membrane at a linear velocity of one foot per second and at a pressure of 1500 p.s.i.

As shown in the figure, the additive had the effect of reducing the decline in flux by a factor of about one-half during the four days of operation. When the additive was removed during the fifth day, the flux fell precipitously, but not to the level of the control. A similar test run subsequently on new membranes, but without the benefit of perchloric acid additive to the feed water showed the normal decline decay pattern.

Having fully described the process and its utilities, it is desired that the invention be limited only within the lawful scope of the appended claims, for example, membrane fixing temperatures within a broader range than 77° to about 90° C. may be used.

We claim:

1. In the process of removing water from aqueous solutions containing impurities, wherein aqueous solution is passed over a cellulose acetate membrane at a pressure above the osmotic pressure of the aqueous solution, the improvement comprising the step of adding perchloric acid to the feed water in the concentration of approximately five to five hundred parts per million of feed water, said perchloric acid serving as a stabilizing agent to slow the decline of the membrane flux.

2. A process as set forth in claim 1 wherein the concentration of perchloric acid is approximately twenty five to one hundred fifty parts per million of feed water.

3. A process as set forth in claim 1 wherein the concentration of perchloric acid is approximately fifty parts per million of feed water.

4. A method for removal of water from aqueous solutions containing impurities which comprises adding perchloric acid to the aqueous solution in a concentration of about five to five hundred parts per million, said perchloric acid serving as a stabilizing agent to slow the decline of the membrane flux, and passing the aqueous solution having said additive over a cellulose acetate membrane at a pressure above the osmotic pressure of the aqueous solution, said membrane being prepared by casting a solution of cellulose acetate, water, a solvent for cellulose acetate, and a swelling agent for cellulose acetate.

5. The process of claim 4 wherein the solvent for cellulose acetate is acetone and the swelling agent for cellulose acetate is magnesium perchlorate, magnesium bromide and zinc bromide.

6. A process as set forth in claim 4 wherein the concentration of perchloric acid is approximately twenty five to one hundred fifty parts per million of feed water.

7. A process as set forth in claim 4 wherein the concentration of perchloric acid is approximately fifty parts per million of feed water.

8. The method for removal of water from aqueous solutions containing impurities which comprises passing an aqueous solution containing perchloric acid in the concentration of approximately 50 parts per million parts of aqueous solution over a cellulose acetate membrane at a pressure above the osmotic pressure of the aqueous solution, said perchloric acid serving as a stabilizing agent to slow the decline of the membrane flux, which membrane is prepared by casting a solution of cellulose acetate, water, acetone and a swelling agent, and then heating the membrane at a suitable temperature.

References Cited

UNITED STATES PATENTS 3,170,867  2/1965  Loeb et al. _____ 210—22

OTHER REFERENCES

"1964 Saline Water Conversion Report," United States Department of the Interior, Office of Saline Water, pp. 42 and 43 relied on.

MORRIS O. WOLK, *Primary Examiner.*

S. MARANTZ, E. G. WHITBY, *Assistant Examiners.*